Patented Mar. 28, 1933

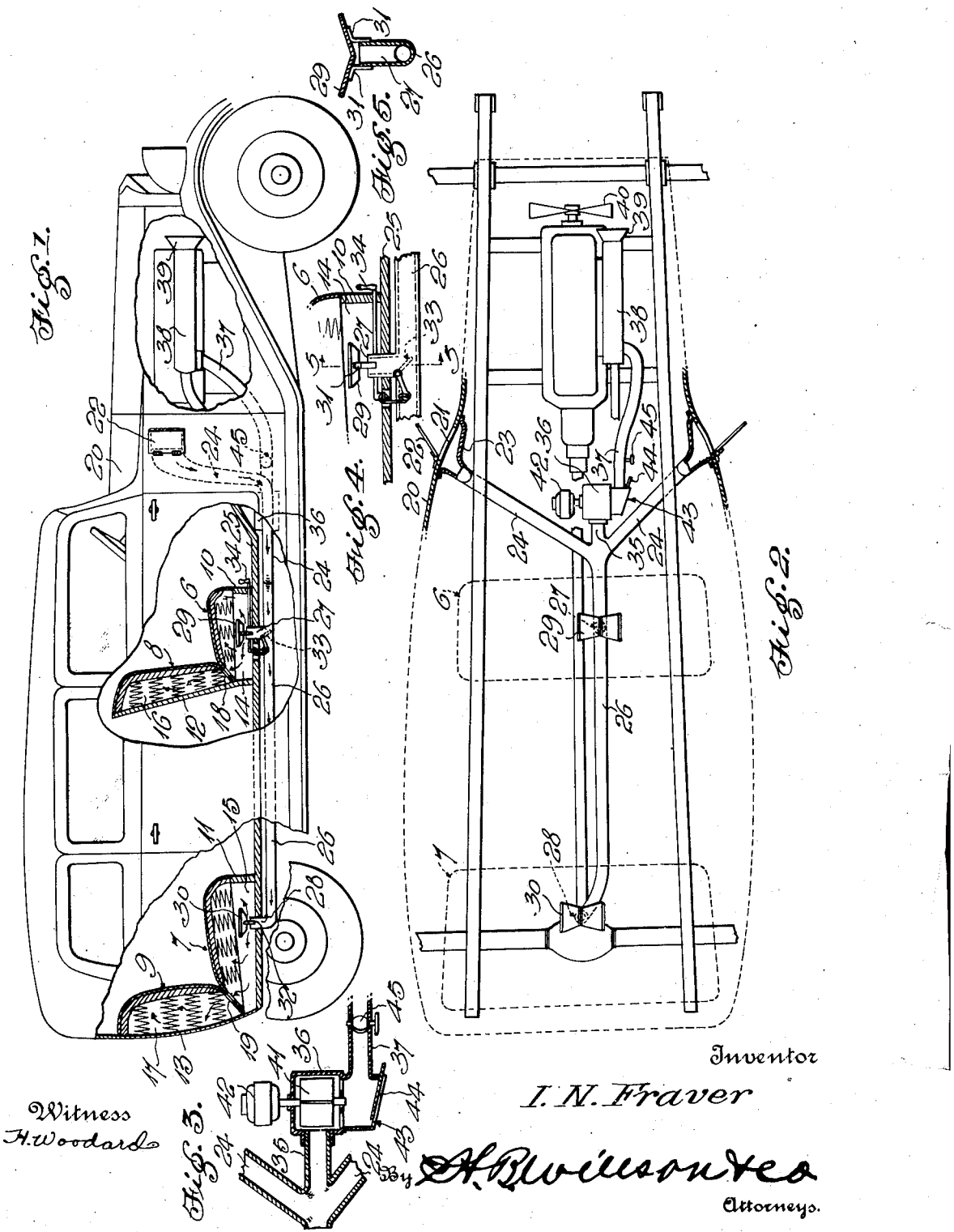

1,903,037

UNITED STATES PATENT OFFICE

IVAN N. FRAVER, OF WEST READING, PENNSYLVANIA

CAR HEATING, COOLING, AND VENTILATING MEANS

Application filed August 14, 1931. Serial No. 557,179.

In the disclosure herein given, the invention relates to heating, cooling and ventilating means, but in other forms, it may constitute only heating and ventilating means or only cooling and ventilating means, and while it is disclosed upon an automobile, it is equally adaptable to other types of motor-driven cars, for instance, busses, motorboats and aircraft.

One object of the invention is to provide novel means for so discharging air into the seat upholstery of the car as to either cool or heat the seats, as may be required for the comfort of the occupants.

Another aim is to make novel provision whereby the air to be discharged into the seat upholstery will be directed into the car by external air-collecting means as long as the car is in motion, and to provide power-driven means independent of the car motor for effecting the inflow of the air while the car is standing still.

A further object is to provide novel means whereby heated air and relatively cool air may be mixed in any required proportions and conducted into the seat upholstery to obtain the most desirable seat temperature for the comfort of the occupants.

A still further object is the provision of a construction which will be comparatively simple and inexpensive both with regard to installation and operation, and will not be liable to get out of order.

With the foregoing and minor objects in view, the invention resides in the novel subject matter hereinafter described and claimed, description being accomplished by reference to the accompanying drawing.

Fig. 1 is a side elevation partly broken away and in section, showing the invention embodied in an automobile.

Fig. 2 is a plan view partially in section with parts omitted.

Fig. 3 is a fragmentary horizontal sectional view.

Fig. 4 is a detail side elevation partly in section showing the means for discharging and distributing the air under one of the seats.

Fig. 5 is a detail transverse sectional view on line 5—5 of Fig. 4.

The invention will be described in connection with the sedan shown, but is obviously useable regardless of the type of body with which the car is provided, or the number of seats.

The numerals 6 and 7 denote front and rear upholstered seats, 8 and 9 have reference to the upholstered seat backs whose lower edges abut the rear edges of said seats, 10 and 11 denote conventional supporting means for the seats 6 and 7, and 12 and 13 refer to supporting means for the seat backs 8 and 9. The supporting means 10 and 11 form with the hollow upholstered seats 6 and 7, two chambers 14 and 15, and the seat back supports 12 and 13 co-act with the hollow seat backs 8 and 9 in forming additional chambers 16 and 17. The chambers 14 and 16 are placed in communication with each other by forming registering openings 18 through the abutting portions of the seat 6 and the back 8. Similarly, the chambers 15 and 17 communicate with each other through openings 19 formed in the abutting portions of the seat 7 and the back 9. It will thus be seen that any air whether heated or relatively cool, which is discharged into the chambers 14 and 15, will heat or cool the seats 6 and 7, as the case may be, will also enter the chambers 16 and 17, and will consequently heat or cool the seat backs 8 and 9, as required. The air escapes from the chambers by passing through the paddings and coverings of the seats and backs if said coverings be of fabric, but if materials impervious to air passage be employed, other provision may of course be made for allowing escape of the air.

The cowl 20 of the automobile is provided in its opposite vertical sides with two air-admission openings 21, and with pivoted vanes 22 for collecting air at the exterior of the car and directing it through said openings, appropriate adjusting means (not shown) being of course provided for said vanes. The openings 21 communicate with the enlarged inlet ends 23 of two pipe branches 24 which extend downwardly to a point below the car floor 25 and here communicate with a substantially central longitudinal pipe 26 which extends under such floor. This pipe 26 is provided with two upstanding discharge portions 27 and 28 which communicate with the chambers 14 and 15 respectively, and air-deflecting plates 29 and 30 are mounted over said pipe portions 27 and 28 to distribute the air in the aforesaid chambers 14 and 15. The deflectors 29 and 30 are preferably carried by appropriate brackets 31 and 32 secured to the pipe portions 27 and 28. A valve 33 controllable by appropriate manually actuated means 34, is shown for allowing any required amount of air to pass upwardly through the pipe portion 27 and for allowing the remainder of the air traveling through the pipe 26, to travel on to the portion 28, and this valve may be constructed to close the pipe 26 behind the outlet 27 if desired, or to close said outlet 27, so that all of the air may be directed under the front seat or under the rear seat, as desired. By leaving one or more of the windows of the car slightly open or providing other means for the exit of air, all air escaping from the chambers 14, 15, 16 and 17, will leave the car and hence will effectively ventilate the latter. In order that no undesirable fumes shall enter, the openings 21 are preferably well above the usual slits or louvers in the automobile hood.

The pipe 26 is provided with an additional air inlet denoted by the reference characters 35, 36, 37, 38 and 39. 35 is a branch joining the pipe 26 at its juncture with the branches 24, 36 is a blower casing, 37 is a pipe leading to this blower casing from the part 38, and this part 38 is an air heater around the exhaust manifold or other part of the automobile motor, said heater having the air-collecting means 39 which is preferably behind the conventional fan 40. A blower 41 is provided in the casing 36 and a small electric motor 42 is provided for said blower, and in addition to having the warm air inlet 37, said casing 36 is provided with a relatively cool air inlet 43. A valve 44 is provided for this inlet 43, and another valve 45 is employed in the inlet 37. When the blower 41 is driven, if the valve 44 be open and valve 45 closed, only relatively cool air will be forced rearwardly through the pipe 26; if valve 44 be closed and valve 45 open, only heated air will be forced into pipe 26, and if both valves 44 and 45 be partially open, heated air will be mixed with relatively cool air and hence air at the desired temperature may be forced on into pipe 26. All of the air forced into this pipe, of course, finds its way through the upholstery of the seats, producing the desired cooling and ventilating action, or heating and ventilating action, as occasion may demand.

As long as the car is in motion with the vanes 22 open, the comparatively cool air from the outside of the car, enters the pipe 26 through the openings 21 and the pipe branches 24, effectively cooling the seats. When the car is standing still, relatively cool air may be taken in through the inlet 43 of the blower casing 36 and forced on into the seat upholstery, the blower 41 being operated only when the car is standing still. In comparatively cold weather, as long as the car is in motion, air is directed into the heater 38 by the portion 39 thereof, and the heated air is conducted on rearwardly into the seat upholstery. While the car is standing still, the blower 41 may be driven to force the heated air continually into the car. When only cool air is to be driven into the machine by the blower, valve 44 is opened and valve 45 closed; when only heated air is to be forced rearwardly by said blower, valve 44 is closed and valve 45 is opened, but when it is most desirable to mix heated and relatively cool air, valves 44 and 45 may be relatively adjusted to obtain the most desirable air temperature.

The general construction shown and described is efficient and advantageous and is preferably employed. However, within the scope of the invention as claimed, variations may be made.

I claim:

1. In combination with a motor-driven car having a cowl, an upholstered seat and supporting means for said seat forming therewith a chamber, said cowl being provided with an air admission opening and a vane for directing air into said opening; an air conducting pipe having an air inlet end positioned to receive air entering through said opening, said pipe extending downwardly from said inlet end, rearwardly under the floor of the car and upwardly into said chamber.

2. In combination with a motor-driven car having a cowl, an upholstered seat and supporting means for said seat forming therewith a chamber, said cowl being provided with air admission openings in opposite sides and with vanes for directing air into said openings; an air conducting pipe having a branched end portion whose branches communicate at their outer ends with said openings, said branches extending downwardly to the body portion of the pipe, the latter extending rearwardly under the floor of the car and upwardly to said chamber.

3. In combination with a motor-driven car having seat upholstery; an air passage for conducting air into said upholstery, said passage having cool and warm air inlet portions, the latter being provided with air heating means, said cool and warm air inlet portions being provided with means for collecting atmospheric air and directing it into them while the car is in motion, power driven means independent of the car motor for forcing either cool air or warm air from said heater, through said passage either while the car is in motion or while the car is standing still, and valve means for either regulating or preventing admission of the cool or hot air to the aforesaid passage.

4. In combination with a motor-driven car having a cowl, an upholstered seat and supporting means for said seat forming therewith a chamber, said cowl being provided with air admission openings in opposite sides with vanes for directing air into said openings; an air conducting pipe having a branched end portion whose branches communicate at their outer ends with said openings, said branches extending downwardly to the body portion of the pipe, the latter extending rearwardly under the floor of the car and upwardly to said chamber, a power-operable blower whose outlet communicates with said pipe between said branches, said blower having a valved fresh air inlet and a valved warm air inlet, the latter being provided with an air heater.

5. In combination with a motor driven car having a cowl, said cowl being provided with air admission openings in opposite sides and with vanes for directing air into said openings; an air conducting pipe having a branched end portion whose branches communicate at their outer ends with said openings, said branches extending downwardly to the body portion of the pipe, the latter extending rearwardly under the floor of the car and upwardly through said floor, and a power operable blower whose outlet communicates with said pipe between said branches.

In testimony whereof I affix my signature.

IVAN N. FRAVER.